US009576204B2

(12) United States Patent
Goldner et al.

(10) Patent No.: US 9,576,204 B2
(45) Date of Patent: Feb. 21, 2017

(54) SYSTEM AND METHOD FOR AUTOMATIC CALCULATION OF SCENE GEOMETRY IN CROWDED VIDEO SCENES

(71) Applicant: NICE-SYSTEMS LTD., Ra'anana (IL)

(72) Inventors: Vladimir Goldner, Tel Aviv (IL); Yaniv Gurwicz, Givataim (IL)

(73) Assignee: QOGNIFY LTD., Ra'anana (IL)

( * ) Notice: Subject to any disclaimer, the term of this patent is extended or adjusted under 35 U.S.C. 154(b) by 34 days.

(21) Appl. No.: 14/666,338

(22) Filed: Mar. 24, 2015

(65) Prior Publication Data
US 2016/0283798 A1 Sep. 29, 2016

(51) Int. Cl.
G06K 9/00 (2006.01)
(52) U.S. Cl.
CPC ....... G06K 9/00778 (2013.01); G06K 9/00221 (2013.01)
(58) Field of Classification Search
CPC combination set(s) only.
See application file for complete search history.

(56) References Cited

U.S. PATENT DOCUMENTS

| 6,342,290 | B1* | 1/2002 | Conk | B44F 1/10 |
| | | | | 2/900 |
| 6,512,846 | B1* | 1/2003 | Luo | G06T 7/0042 |
| | | | | 382/164 |
| 8,059,154 | B1* | 11/2011 | Kiro | H04N 17/002 |
| | | | | 348/184 |
| 8,116,564 | B2* | 2/2012 | Kilambi | G06K 9/00362 |
| | | | | 382/103 |
| 8,218,820 | B2* | 7/2012 | Hayashi | B60R 1/00 |
| | | | | 382/104 |
| 8,457,357 | B2* | 6/2013 | Foote | G06T 7/004 |
| | | | | 382/103 |
| 8,913,128 | B2* | 12/2014 | Wu | H04N 7/18 |
| | | | | 180/167 |
| 2002/0114525 | A1* | 8/2002 | Bolle | G06T 9/001 |
| | | | | 382/232 |
| 2002/0150280 | A1* | 10/2002 | Li | G06K 9/00228 |
| | | | | 382/117 |

(Continued)

OTHER PUBLICATIONS

Jonathan Deutscher et al. "Automatic camera calibration from a single Manhattan image." Systems Research Center—Compaq Computer Corporation, Palo Alto, CA pp. 175-205. Conference: European Conference on Computer Vision ECCV, May 27-Jun. 2, 2002. http://research.microsoft.com/pubs/75875/calibrate.pdf Retrieved from the internet on Jun. 15, 2015.

(Continued)

Primary Examiner — Alex Liew
(74) Attorney, Agent, or Firm — Pearl Cohen Zedek Latzer Baratz LLP

(57) ABSTRACT

A system or method for automatic calculation of scene geometry may include receiving, by a processor, a video stream including a plurality of video frames. A video frame may be divided into blocks, and a vertical vanishing point of the video stream may be determined based on a dominant orientation of detected edges in the blocks. A horizon and scale of the video stream may be estimated based on optical flow of pixels between two consecutive video frames. A set of human heads may be detected in a video frame of the video stream based on the estimated horizon and scale of the video stream.

17 Claims, 7 Drawing Sheets

(56) References Cited

U.S. PATENT DOCUMENTS

| | | | |
|---|---|---|---|
| 2004/0066966 A1* | 4/2004 | Schneiderman | G06K 9/527 382/159 |
| 2004/0076330 A1* | 4/2004 | Sloan | G06K 9/3241 382/228 |
| 2005/0179688 A1* | 8/2005 | Chernichenko | G06T 5/006 345/427 |
| 2006/0215031 A1* | 9/2006 | Krahnstoever | G06T 7/0018 348/187 |
| 2007/0003141 A1* | 1/2007 | Rittscher | G06K 9/00778 382/181 |
| 2008/0107341 A1* | 5/2008 | Lu | G06K 9/00248 382/190 |
| 2009/0128309 A1* | 5/2009 | Hue | G06T 7/0008 340/425.5 |
| 2009/0167866 A1* | 7/2009 | Lee | G06K 9/3233 348/159 |
| 2010/0295948 A1* | 11/2010 | Xie | G06T 7/0018 348/175 |
| 2010/0329513 A1* | 12/2010 | Klefenz | G01C 21/00 382/104 |
| 2011/0075930 A1* | 3/2011 | Cerosaletti | G06K 9/00677 382/190 |
| 2012/0327220 A1* | 12/2012 | Ma | G06T 7/0038 348/135 |
| 2013/0286205 A1* | 10/2013 | Okada | H04N 7/18 348/148 |
| 2014/0049600 A1 | 2/2014 | Goldner et al. | |
| 2014/0314270 A1* | 10/2014 | Nguyen | G06K 9/0063 382/103 |
| 2014/0328512 A1 | 11/2014 | Gurwicz et al. | |
| 2015/0036883 A1 | 2/2015 | Deri et al. | |
| 2015/0302591 A1* | 10/2015 | Kim | G06T 7/0046 382/103 |

OTHER PUBLICATIONS

Liu et al. "Surveillance Camera Autocalibration based on Pedestrian Height Distributions" BMVC 2011—The 22nd British Machine Vision Conference pp. 1-11. http://www.bmva.org/bmvc/2011/proceedings/paper117/paper/paper117.pdf University of Dundee, Aug. 29-Sep. 2, 2011 Retrieved from the internet on June. 16, 2015.

* cited by examiner

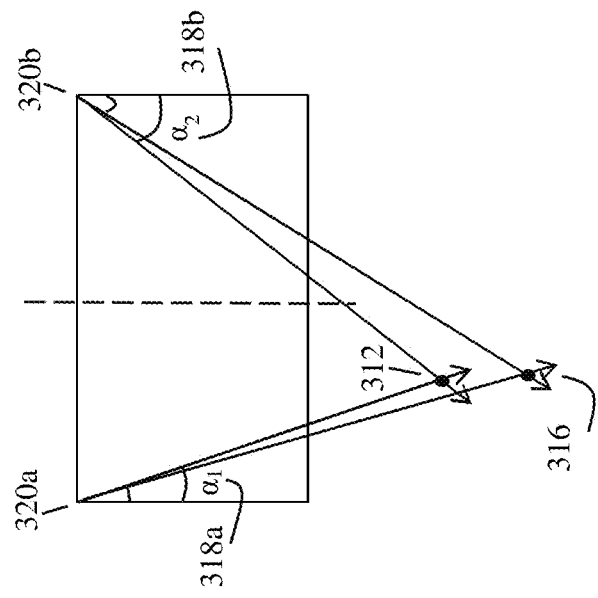
FIG. 3B
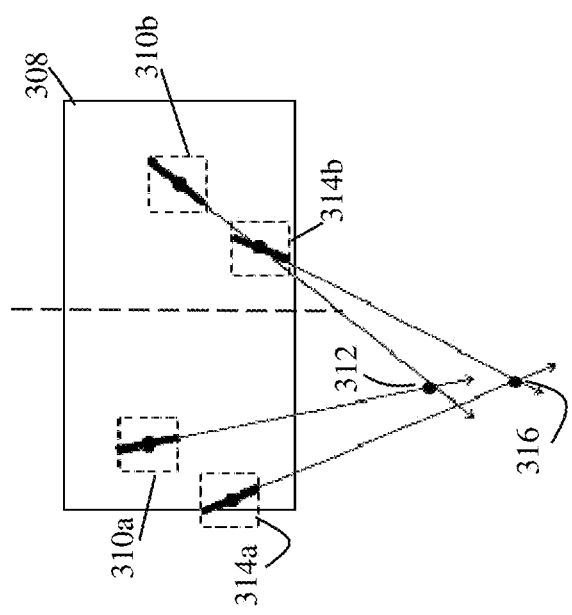

SYSTEM AND METHOD FOR AUTOMATIC CALCULATION OF SCENE GEOMETRY IN CROWDED VIDEO SCENES

FIELD OF THE PRESENT INVENTION

The present invention relates to video surveillance and analytics.

BACKGROUND

Human detection in video streams or feeds may require knowing or determining a scene or setting's geometry in order to estimate a human height (the height or a person depicted in a stream) at any place in a video frame or video image. For fixed/static video cameras, the scene geometry may be configured manually. For some video cameras, such as pan-tilt-zoom cameras (PTZ cameras) or cameras that move around a room, the scene geometry may be unknown when the cameras move to a new arbitrary location within a scene or if the cameras perform pan, tilt, or zoom operations. For these cameras, real-time or automatic human detection may be difficult. Providing manual calibration after every camera movement may be an unrealistic solution.

Some automatic calibration methods of surveillance cameras may not be useful for crowded scenes or settings with a higher number of people in the video images. The existing solutions may rely on a background model (background subtraction), which is irrelevant for crowded scenes, where the people in the video images may occlude each other, and the background subtraction can't isolate individual objects. In addition, there are humans' reflections and shadows in many scenes, such that human size cannot be extracted by that method.

Other solutions propose automatic calibration based on three orthogonal dominant directions—straight lines created by buildings, roads, floor tiles, or walls edges. These solutions may not solve the problem of crowded scenes because three orthogonal dominant directions may not always be visible, especially by zoomed PTZ and human height may be not calculated in pixels.

SUMMARY

A system or method for automatic calculation of scene geometry may include receiving, by a processor, a video stream including a plurality of video frames. A video frame may be divided into blocks, and a vertical vanishing point of the video stream may be determined based on a dominant orientation of detected edges in the blocks. A horizon and scale of the video stream may be estimated based on optical flow of pixels between two consecutive video frames. A set of human heads may be detected in a video frame of the video stream based on the estimated horizon and scale of the video stream.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIGS. 3A and 3B are illustrations of determining a dominant orientation of a block, according to embodiments of the invention.

Figure 1:
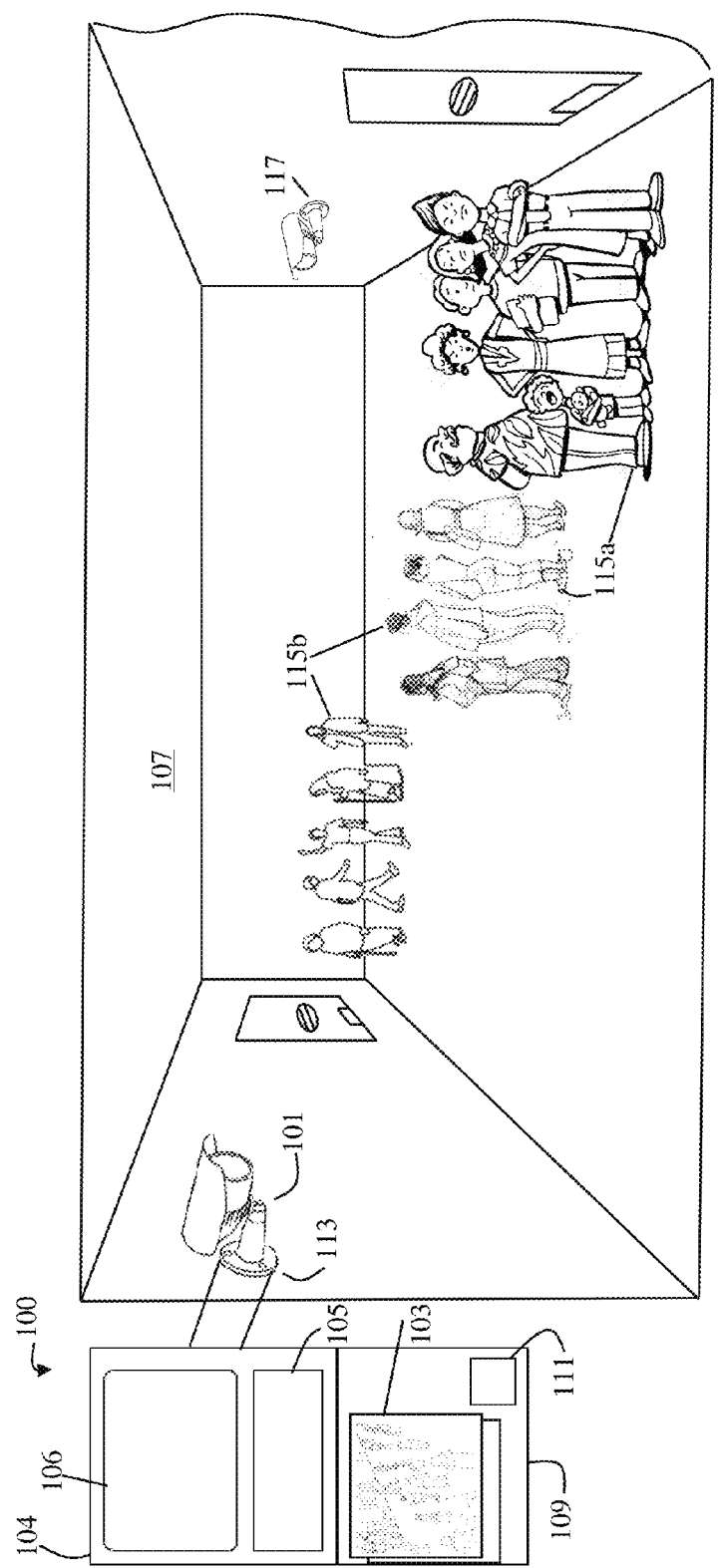
FIG. 1 depicts a video surveillance and analytics system for detecting change, according to embodiments of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may allow video surveillance or video analytics systems to detect or track humans (people) in a video stream. The video stream may depict any type of scene or setting that includes human objects: sparse, semi-crowded and crowded scenes. Instead of extraction of a few global or full body features, embodiments may extract or detect a large number of small local features or local edges that may be available or present in any type of crowded scene. The surveillance system may be able to detect human objects without requiring the isolation of objects subtracted from the background, or the isolation of visible three-dimensional orthogonal straight lines. A real-time human detection algorithm may require determination of scene parameters or scene geometry, such as average human size (e.g., in pixels, as opposed to the actual average size of the real world humans in real-world dimensions) at any place of in a video frame.

Although such a method may requires a number of frames (rather than a single image, as some other methods require), it may produce a fast, universal and robust solution. Embodiments of the invention may include receiving, by a processor, a video stream including a plurality or a series (e.g., a time-ordered series) of video frames (e.g., a movie, or a feed from a video camera). One of the video frames may be initially divided into non-overlapping blocks, sections or regions. A vertical vanishing point of the video stream may be determined based on a dominant orientation of detected edges in the blocks. A detected edge may be an isolated group of pixels from an original video image that follow an edge of an object depicted in the original video image. The group of pixels may have a predominant direction that indicates the edge's shape. A horizon and scale of the video stream may be estimated based on optical flow of pixels between two consecutive video frames. A set of human heads depicted in a video frame of the video stream may be detected based on the estimated horizon and scale of the video stream.

While embodiments herein describe software and hardware solutions that calibrate pan-tilt-zoom (PTZ) cameras automatically or in real-time, the software and hardware solutions may be application to other kinds of surveillance video cameras, such as cameras without a pan, tilt, or zoom functionality PTZ cameras may typically have three movement options: panning—rotation in a horizontal plane of a camera, tilting—rotation in a vertical plane, and zoom—changing the focal or zoom length of the camera's lens. Other cameras may include virtual pan-tilt-zoom (VPTZ) capabilities where a high-resolution camera digitally zooms and pans into portions of the image, with no physical camera movement. Camera positions may also exhibit pitch and roll movement, or rotation around perpendicular axes.

In order to detect or track humans in real-time, no matter the camera position, a system or method may have at least three scene parameters or features calculated: vertical vanishing point, horizon, and scale. A vertical vanishing point may be a point of intersection of all "vertical" lines in the frame, where the lines shown in the frame (which may not appear vertical in the frame and may appear slanted for example) are in fact vertical lines in the 3D world. If the camera has a downward tilt (like almost all surveillance cameras) then the vertical vanishing point may be under the frame center, otherwise it's above the frame center. If camera has strictly horizontal tilt then the vertical vanishing point is located in infinity, e.g., vertical lines in the 3D or real world also appear vertical and parallel in the frame. Often, a vertical vanishing point may not be within the confines of a video frame or image. 3-dimensional vertical lines of the scene (e.g., the x, y, and z axes of a scene depicted on a video camera) may not always be seen as vertical lines on a video frame, especially on the far left and right edges of the frame. If the camera is tilted downward, a frame may have left tilt on the left side of the frame and right tilt on the right side. The closer the lines to the frame's center, the smaller their tilt. These tilted lines on the right and left side of a frame may intersect in one point. This intersection point may be called the vertical vanishing point.

A horizon line may be termed a set of horizontal vanishing points. A horizon may be a line that is the intersection of the image plane with a plane parallel to the ground plane passing through the camera center. Human objects may have greater size in pixels when they are physically closer to the camera in a scene or setting. The objects closer to the camera may be located in a lower part of the frame than the further objects. The relation between objects' size in pixels to object's Y-coordinate (e.g., an object's position relative to the top or bottom of a frame; y when used herein refers to the vertical axis) may be linear. Accordingly, for a certain y-position, an object's size is zero. This y-position may be the horizon.

While dealing (for example) with human objects, one may need to determine the size in pixels of, say, a 6 feet tall human at some location in the frame. Scale describes the size in pixels of an object with a known 3D world size. Knowing horizon, scale and an object's 3D size ensures knowing object's size in pixels at any location in the frame.

According to embodiments of the invention, a system or method may determine the parameters described above in two main stages: an estimation stage and a refinement stage. During the estimation stage, the vertical vanishing point may be calculated or determined and the horizon and scale may be estimated based on features extracted from one or more video frames. Such features may be for example detected edges and an estimation of the size of a human head, for example. The vertical vanishing point may be calculated by, for example, dividing a video frame or image into blocks (such as, for example, a block having dimensions of 8×8 pixels; other dimensions may be used and blocks need not be square). For blocks with detected edges, the dominant orientation of the blocks may be used to determine a vertical vanishing point. Intersection points connecting two vectors from a pair of blocks may be collected as hints for the vertical vanishing point. The horizon and scale may be initially estimated based on optical flow of pixels between two consecutive video frames from the video stream, for example. Using the estimated horizon and scale, a set of human heads may be detected as being shown or depicted in a video frame. The estimated horizon and scale may be adjusted or altered based on the detected set of human heads. In an optional refinement stage for detecting and tracking humans or people, the horizon and scale may be refined or re-calculated with greater precision using feedback from the human detection process.

FIG. 1 depicts a video surveillance and analytics system 100 for detecting change, according to embodiments of the invention. A video camera 101 may monitor or survey a crowded scene or background 107, such as a train station, office lobby, waiting room, or other settings with numerous humans or people, for example. The video camera 101 may be a color or black-and-white video camera which detects or records visible light, or video camera 101 may be a thermal video camera which detects or records infrared thermal energy, or video camera 101 may be any other sensing and imaging device, using any relevant modality (for example, a radar-based imaging device which detects radio-frequency waves, or an imaging device which detects ultrasound waves). Video camera 101 may collect for example digital images, although other cameras may be used. Video camera 101 may be coupled to a processor 105 or other computing system which performs analysis on a stream of images from the video camera 101. Processor 105 may receive one or more video images or frames 103 from a video stream captured or recorded by the video camera 101, e.g. a sequence of still images. Video image 103 may be processed and stored in memory 109 accessible by processor 105. Processing of the video image 103 may be in real-time, e.g., during a live feed, or may occur at a time later than when the video image was originally recorded (e.g., ten minutes, 3 days, 1 month or longer). Processing of the video image or frames 103 may include dividing individual images into non-overlapping sections or blocks (e.g., blocks which do not overlap in terms of regions of the image within the blocks) and detecting or extracting edges or other local features from the blocks. Video surveillance and analytics system 100 may be able to automatically calibrate a video camera and determine a scene's geometry by, for example, estimating parameters 111 of the scene 107, including vertical vanishing point, horizon, and scale and storing the parameters 111 in memory 109. The parameters 111 may be used to track and detect humans 115*a* within a scene 107 or setting. The parameters 111 may be determined in real-time, based on the images received by the video camera 101 and may not need manual calibration or input.

For example, video surveillance and analytics system 100 may monitor a scene 107 at a first position 113 in a room. The camera 101 at position 113 may have a particular pan, tilt, or zoom for surveillance. The panning, tilting, or zooming may remain the same, or change. Based on the perspective of the camera 101, the video surveillance and analytics system 100 may determine, for example, a vertical vanishing point, horizon, and scale of its received video feed. Video system 100 may be able to detect humans 115*a* in the scene 107, even though they may have, for example, different sizes and perspectives with respect to the camera 101. If the video camera 101 is moved to a different position 117 in a room, or if the video camera's pan, tilt, and zoom functions are changed, processor 105 may be able to determine or calculate the new scene geometry, based on the video frames of the scene 107 that it receives (by, e.g., extracting local edges and features from the video frames). The new scene geometry (e.g., the new vertical vanishing point, horizon, and scale of the video stream) may be different from the scene geometry determined in the first position 113. Using new scene geometry parameters 111, processor 105 may be able to detect humans 115*b*, even though they have different perspective and size characteristics from the humans 115*a* detected at first position 113. Processor or computing system 105 may display the video stream and the detected humans within the video stream. The video stream display and other output may be output or displayed to output device(s) 106, e.g., a computer monitor or other display or another output device such as a speaker. Processor or computing system 105 may further store the determined parameters 111 and received video stream images 103 in order to continuously detect humans in scene 107, or to refine the values of parameters 111 (e.g., refine the vertical vanishing point, horizon, and scale of the scene 107.

While in one embodiment processor 105 is described as performing certain functionality, in other embodiments, multiple, distributed or different processors, or processors having different structures, may be used. Modules and systems described herein, such as a refinement module, a robust change detection module within a video analytics system, and other modules, may be or may have their functionality performed by processor 105. Processor(s) 105 may include one or more processors (of the same or different type) may be part of a larger computing system 104, e.g., a server that analyzes video data. Processor 105 may be configured to perform embodiments or steps described herein for example by executing software or encoded instructions. Dedicated processors (e.g., video or graphics chips) or dedicated processor areas may be used or may be included as part of processor(s) 105, and such processors may be configured to perform such tasks for example by dedicated circuitry or by executing software. Video camera 101 may also be configured to perform steps described herein by including processors within video camera 101 or by executing software or encoded instructions. Memory, such as memory 109, may be configured to store data used as discussed herein such as images for comparison or analysis, such as reference images and video images, by storing them in hard drives, random access memory, or databases for example. Memory 109 may be configured to store executable software or encoded instructions that are accessible by processor 105 or other processors.

Figure 2:
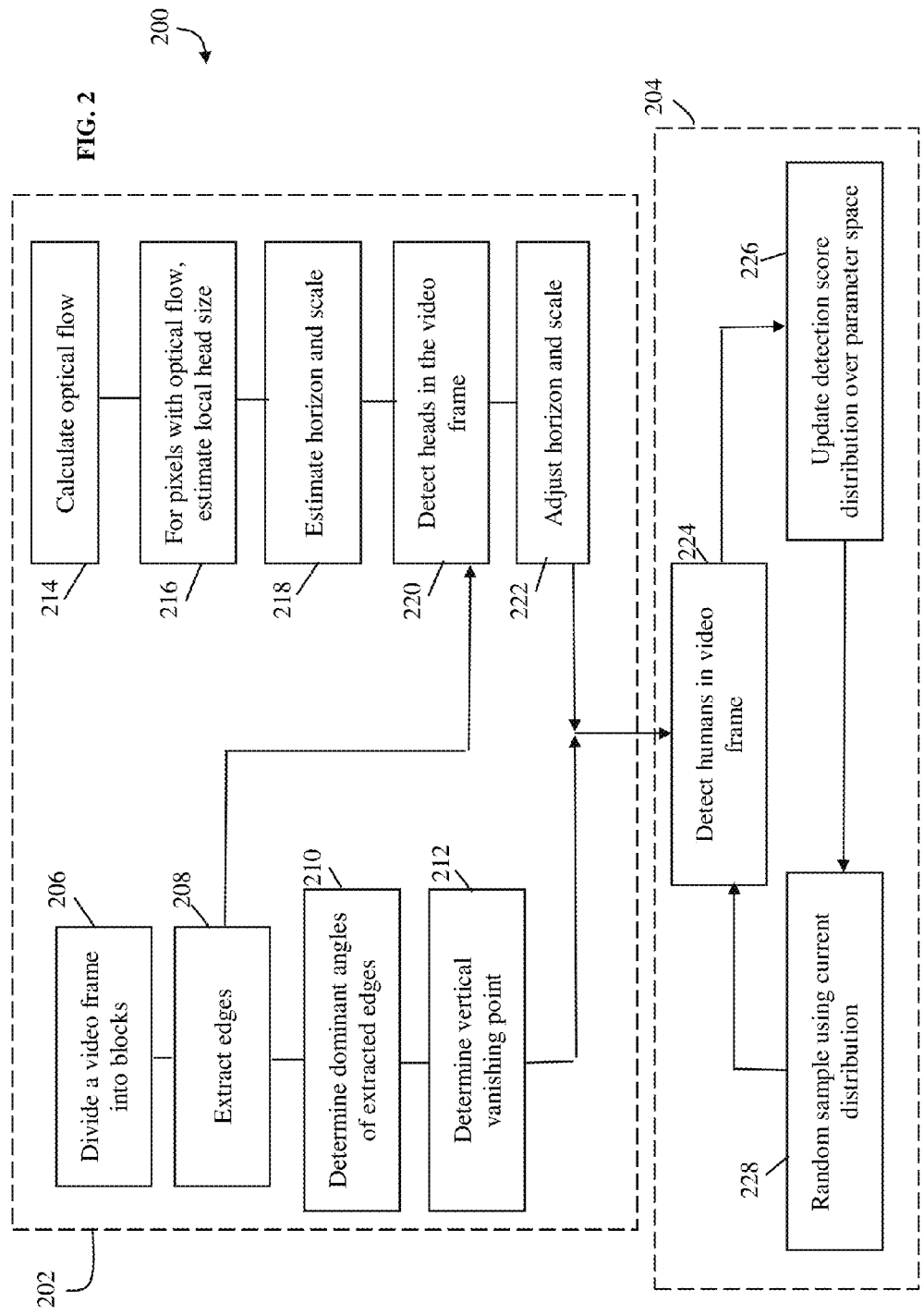
FIG. 2 is a flow diagram for an automatic calculation of scene geometry algorithm in a video stream, according to embodiments of the invention.
Figure 3A:
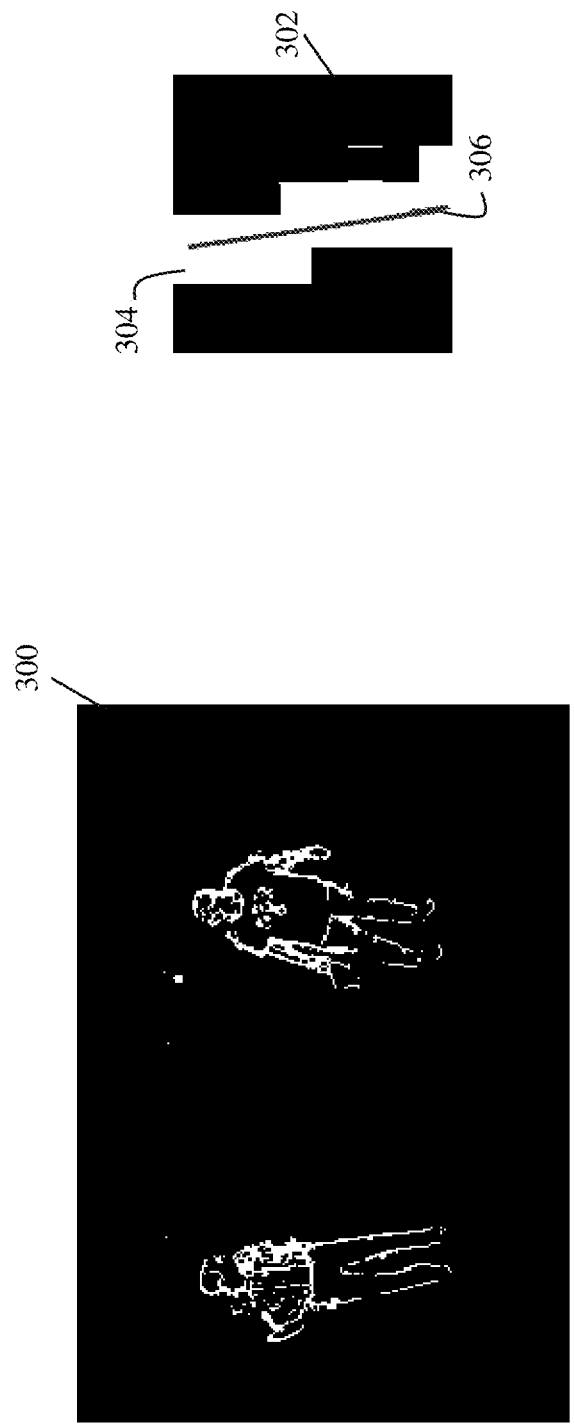

FIG. 2 is a flow diagram 200 for an automatic calculation of scene geometry algorithm in a video stream, according to embodiments of the invention. An automatic calculation of scene geometry algorithm for automatic human detection (performed or implemented by, e.g., video surveillance and analytics system 100 in FIG. 1) may include two modules such as an estimation module 202 and a refinement module 204; other or different modules may be used. The estimation module 202 may calculate a vertical vanishing point and estimate the horizon and the scale of a crowded scene, for example. Initially, at step 206, a first video frame may be divided into non-overlapping blocks. The blocks may be any dimension, such as 8×8 or 10×10 pixels, or 8×10 pixels. Blocks may be used to adequately capture a local edge or feature. In step 208, edges may be extracted from each block A Sobel filter, or other high-pass filter for edge detection for example, may be applied to each block in order to isolate a non-horizontal edge in each block. Alternatively, steps 208 and 206 may be reversed, where the high-pass filter may be initially applied to a first video frame, and then the first video frame may be divided into non-overlapping blocks. For each of the blocks which include non-horizontal edges, a processor may determine, in step 210, a dominant angle of the extracted edges. In step 212, the processor may determine a vertical vanishing point based on the dominant angles of the extracted edges. Each of the dominant angles may provide a "weak" hint for locating the vertical vanishing point. A histogram of these hints may be analyzed to determine the most likely position. Non-limiting example details of steps 206-212 are illustrated at FIGS. 3A and 3B, for example.

In parallel or concurrently with determining the vertical vanishing point in steps 206-212, the estimation module 202 may estimate horizon and scale by initially calculating optical flow of pixels in the video stream at step 214. Optical flow may be a measure of an object's movement speed, in pixels per second, for example (as opposed to actual, real world speed), as it travels across the screen or its position changes in different images through consecutive frames. To calculate optical flow, the estimation module 202 may detect corners or other "interesting" points in a first video frame and a second consecutive video frame and determine the difference in pixels positions between the two frames for the interesting point or corner. Since people closer to the video camera may have a speed in pixels greater than people further from the camera, optical flow may provide an initial coarse estimation of the horizon and the scale, especially when taking into account average ground speed of humans as between 3-6 km/h.

To choose interesting points or corner points within video frames, known algorithms may be used, such as the Harris corner detection algorithm, which isolates positions within an image that is most likely to have a change in all directions u and v, if u and v are shifts in horizontal and vertical position within the image. For each of these corner points in a first video frame and second consecutive video frame, optical flow may be calculated between the two frames, using the Kanade-Lucas-Tomasi (KLT) feature tracker algorithm, for example. The optical flow algorithm may find pixels in the second frame that match to the corners chosen in the first frame. The KLT algorithm may use spatial intensity information to direct the search for the positions between two frames that yield the best match. The algorithm may examine fewer potential matches between the images than with traditional feature tracking techniques. For static objects, their corner points may not have a change in position between frames, e.g., their optical flow may be determined to have zero strength. For moving objects, such as humans walking across a scene, optical flow strength may depend on the objects' speed (in terms of pixels per second).

In step 216, local head size, or the size of a typical human head at different positions in a video frame, may be estimated or calculated based on the pixels with optical flow found in step 214. Since objects closer to a camera may have a faster optical flow than objects further away from the camera, the relationship between a y-coordinate in a video frame and optical flow may be determined. In other embodiments, different positional relationships may be found, such as the relationship between the x-coordinate and optical flow. For more efficient computation, the y-coordinate may be quantized to, for example, 256 y-slices. Other values may be used, such as 512 or 200 slices or bins. Every detected corner point with non-zero optical flow may be assigned a y-slice and an optical flow value (e.g., the difference in pixel positions between two video frames for the same corner point).

Given the corners with their flow-vectors, a histogram of 256 bins (or a bin for every Y-slice) may be generated containing the flow lengths at each of the y-slices. For all non-empty bins, two arrays F, Y may be created where F is the average flow length in the bin, and Y is the Y-coordinate of the appropriate Y-slice. The relationship between flow length and y-slice may be determined through a linear regression between F and Y arrays, $F(Y)=aY+b$.

Local head size may then be estimated based on the linear regression between F and Y. Assuming that a video frame rate of the video stream of 12 frames per second, average walking speed of human objects is 1 meter/sec (3.6 km/h), and average human head width is approximately 20 centimeters (cm), then, between two subsequent frames an average human object may pass distance of 1 m/sec divided by 12 frames/sec at approximately 8 cm. Other parameters or assumptions may be used. Therefore, if a human has a flow length of p pixels, then its head size is 2.5 p pixels (20/8=2.5). The above linear regression result is a linear function $F(Y)=aY+b$ converting Y coordinate to a flow length. Then local head size H at coordinate Y may be represented as $H(Y)=2.5(aY+b)$, a linear function converting a Y coordinate of a video frame to a head width in pixels located at Y.

In step 218, the horizon and scale of the video stream may be determined based on the above function H(Y). The horizon location may be a coordinate Y for which $H(Y)=0$. Accordingly, horizon may be estimated or calculated as $-b/a$. Scale may be a head width in pixels at some specific point, such as the frame center $(x_c, y_c)$. A different point may be used to measure scale, for example. Thus, scale may be estimated as $s=2.5(a\ y_c+b)$. This provides a course estimation of horizon and scale. Determining a horizon h and scale s may allow head size in pixels to be derived at any point y in the video frame.

At step 220, using this coarse estimation and the fact that most human heads have nearly elliptical shape, the Hough transform may be performed to detect moving heads, by trying different possible head sizes (e.g., a refinement of the estimated head sizes). The horizon and scale may be altered adjusted at step 222 by for example analyzing or collecting a set (e.g., a few dozen; other numbers may be used) head sizes in different places on the frame to provide a precise estimation for the horizon and the scale. The more heads are found, the more precise the estimation. Non-limiting example details for steps 220 and 222 are described at FIG. 4, for example.

Using the determined vertical vanishing point from step 212 and the estimated or adjusted horizon and scale from step 222, the detection or refinement module 204 may detect the depiction of human figures in one or more frames and refine the vanishing point, horizon, and scale parameters of the video stream. The refinement module 204 may be optional since the first estimation module 202 may provide a precise estimation for a scene's geometrical features and parameters. If a human detection algorithm used is sensitive to estimation accuracy, the refinement module 204 may be helpful. During the refinement stage, the human detection algorithm may start to operate, while the horizon, scale, and vertical vanishing point are refined or re-calculated using feedback from the human detection. In step 224, a human detection algorithm may be used, such as the well-known human detection algorithm of Dalal & Triggs, which assumes scene geometry of horizon h, scale s, and the vertical vanishing point V. The Dalal & Triggs algorithm may use a histogram of oriented gradients as descriptors (HOG descriptors) in order to recognize human objects. It may require knowing a typical human size in pixels at any place in the frame, or in other words, knowing the scene geometry parameters horizon h and scale s. In addition, the slanted candidate human may be rotated before operating the detection, according to the vanishing point V, such that it becomes vertical in the frame. Given a candidate sample of human object based on the HOG descriptor, the Dalal & Triggs algorithm may use a trained SVM (support vector machine) model to calculate the matching score (detection score) between the sample and the trained model.

Each of the detected human objects may include a detection score. In step 226, a detection score distribution over parameter space may be maintained and updated. A two-dimensional (2D) distribution (grid) G of possible values of the horizon and the scale (h, s) (the same grid G from the last step of the heads detection) may be maintained to track different values of h and s and its human detection accuracy. Given a pair of the parameters (h, s), G(h, s) may be a sum of the human detection results obtained till now using h and s. The initial distribution G may be taken from the heads detection stage. G may be normalized such that the maximal bin of G(h, s) will be 1. In other words, for every pair (h, s), $G(h, s)=G(h, s)/\max_{h,s}\{G(h, s)\}$.

Based on the updated distribution, a random sample of (h, s) may be selected in step 228. For every frame, a random pair (h, s) according to the current distribution G may be used to detect humans. A higher probability may be given to scene geometry values that yield better results. Another grid $G_s$ may be created by the smoothing of G using a low-pass filter (convolution with a 2D Gaussian). The smoothing of G may enable testing neighbor bins in addition to the best (currently winning) bins. It may help to avoid locking in local maxima points and to try also new points. Random pairs (h, s) may be sampled according to the current distribution $G_s$. Supposing that $\{s_i\}$ are the n resulting scores of n detected human objects, such that the scores are located in the range [0, 1], the distribution G may be updated for the next frame by the average detection score:

$$G(h,s) \leftarrow G(h,s) + \Sigma s_i | n$$

When the global maximum bin $(h, s)=\max\_ind\{G(h, s)\}$ remains constant after a number of subsequent human detections, the calibration of the video camera may be fully complete.

FIGS. 3A and 3B are illustrations of determining a dominant orientation of a block, according to embodiments of the invention. Vertical vanishing point calculation (e.g., see steps 206-212 in FIG. 2) may be based on the fact that a human's pose is mainly vertical, and the average vertical orientation of a person's edges may indicate the orientation of a person. A Sobel filtered image 300 in FIG. 3A may indicate vertical edges in an image or video frame. Another high-pass filter may be used besides a Sobel filter. The filtered image 300 may be divided into non-overlapping blocks of, for example, 8×8 or 16×16 pixels or other sizes. For a block 302 including a detected edge 304, the edge's dominant orientation $O_B$ may be determined through two-dimensional principal components analysis (2-D PCA). Other algorithms or analyses may be used. For 2D PCA, two arrays for X and Y coordinates of edges within a block may be compiled. For each of the two arrays, two eigenvalues and their eigenvectors may be calculated. Dominant orientation $O_B$ of the block's edges may be the orientation of the eigenvector matching to the greatest eigenvalue. For example, the dominant orientation of edge 304 in block 302 may be shown by line 306.

In FIG. 3B, pairs of blocks may provide weak hints or indicators for a vertical vanishing point. A vertical vanishing point of the video stream may be based on a set of vanishing points, wherein each vanishing point is an intersection between a pair of detected edges in a pair of blocks. In an image or video frame 308, a plurality of blocks may include edges with dominant orientations. Given a pair of blocks $B_1$ 310a and $B_2$ 310b, the intersection of two rays originated from the blocks' centers and having the orientations $O_{B1}$, $O_{B2}$ may provide a hint for the vertical vanishing point $V(B_1,B_2)$ 312. Another pair of blocks $B_3$ 314a and $B_4$ 314b may provide another hint for vertical vanishing point $V(B_3, B_4)$ 316. For greater robustness, it may be best to use pairs of blocks having a distance between them that is at least half of the frame width. For example, blocks 314a and B 310b may be a pair that provides another hint, but blocks 310a and 314b may not. If a vertical vanishing point is to left of center of the image 308, then the camera may exhibit roll movement; if a camera has no roll movement, then the vanishing point may be under the center of the frame.

A singularity point may occur in the case of nearly parallel orientations because an infinitely small change in one orientation may cause a hint point to move from +∞ to −∞. In order to avoid this singularity point, instead of collecting the x, y coordinates of the hints 312 and 316, the algorithm may use orientations $\alpha_1$ 318a and $\alpha_2$ 318b of the segments connecting every hint with two constant anchor points $A_1$ 320a and $A_2$ 320b, (e.g., the top-left and the top-right corners of the frame). In the case of an infinite vanishing point, $\alpha_1=\alpha_2$ (e.g., the rays may be parallel). For computational efficiency, the orientations $\alpha_1$ and $\alpha_2$ may also be quantized.

For each of the indicators or hints 312 and 316 for the vertical vanishing point, a 2D histogram H of hints may be created as a function of two angles $\{\alpha_1, \alpha_2\}$. H may be projected on each axis ($\alpha_1$ and $\alpha_2$), obtaining two 1D histograms. The median angles for each projection (median values of $\{\alpha_1, \alpha_2\}$), $\mu_1$ and $\mu_2$ correspondingly, may be calculated based on the two histograms of $\alpha_1$ and $\alpha_2$. The final vertical vanishing point V may be determined as the intersection of rays from the anchor points with the orientations $\mu_1$ and $\mu_2$.

Figure 4:
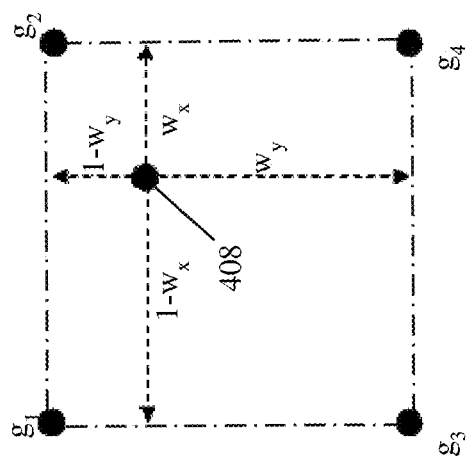
FIG. 4 is an illustration of the Hough transform used to detect elliptical shapes, according to embodiments of the invention.
Figure 4:
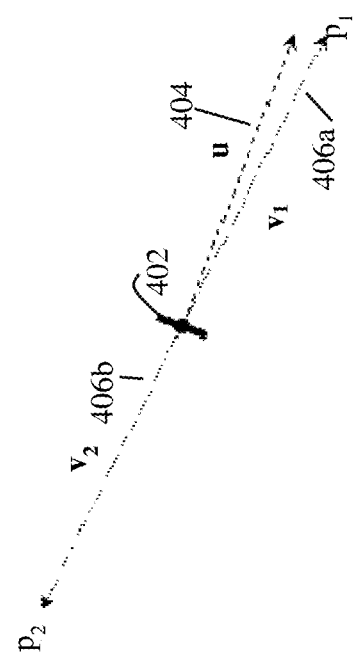

FIG. 4 is an illustration of the Hough transform used to detect elliptical shapes, according to embodiments of the invention. Using the estimation of horizon and scale (e.g., from step 218 in FIG. 2) and the fact that most human heads may have nearly elliptical shape, the Hough transform may detect moving heads in a video stream, by trying different head sizes in one or more video frames. The horizon and scale may be further estimated by generating a set of estimated human head sizes at different locations within a video frame. A set of human heads in the video frame may be detected by initially generating a set of candidate points locating or defining a human head's center.

Every head in the set may be described for example by its Y coordinate and its width. The head detection process may begin with one video frame, for example. The Sobel filter used to detect vertical edges may also calculate two derivatives of the frame: dx and dy. For every edge e 402, given the local derivatives dx & dy, the edge's 402 orientation may be determined by: $\alpha=\text{atan}(dy/dx)$. The edge's strength may be defined by $v=(dx^2+dy^2)^{1/2}$. Edges may be calculated locally for each pixel, and edge strength may use each pixel's neighbor (e.g., the change dx between each pixel and a horizontal neighbor. Each edge may be defined by its location (x, y), orientation and strength. The Hough transform may require quantization/discretization in all 3 dimensions: X, Y, and orientation. For computational efficiency, the orientations may be quantized to for example 9 levels in the range $[0, \ldots, \pi]$ (other numbers of levels may be used as well). Since an estimated head size depends on its Y-position in the frame, the quantization of X, Y may not be uniform in the Y dimension. The frame may be quantized in a non-uniform manner as a grid G, such that square grid cells will have a size of 20% from the estimated head width at cell's region. For example, if in y-coordinate 130 the estimated head width is 30 pixels, then in y-coordinate 130 the grid G has cells of size 6×6 (20% from the width).

As explained previously at step 214 in FIG. 2, every point (x, y) related to an approximate head width w through optical flow: $w(y)=2.5(ay+b)$. Suppose the orientation angle of e is $\alpha$. Since the length w(y) is only a rough estimation of a head's width, different lengths c w(y) may be used, with 16 different coefficients c in the range $[\frac{1}{2}, 2]$. Other numbers of different coefficients may be used, such as 10 or 8. Accordingly, each edge e 402 may contributes 32 candidates for the head center, based on the 16 different coefficients tried. For example, as shown in FIG. 4, a vector $u=(u_x, u_y)$ 404 may be perpendicular to e 402 (or to $\alpha$) with length $|u|=w(y)$, where c=1 as a possible head width. Since a human head may generally have an elliptical form with height 1.5 times greater than width, the vector u may be stretched vertically to mimic this elliptical shape, obtaining a vector $v_1=(u_x, 1.5\ u_y)$ 406a and another vector $v_2=(-u_x, -1.5\ u_y)$ 406b. Thus points $p_1, p_2$ may be the end points of the vectors $v_1, v_2$ originated from the edge e and may be considered as candidates for the head's center. Other points may be candidates for being points that define the head's center for different values of coefficient c.

In summary, every candidate point p at (x, y) may be created by edge e with strength v, orientation a and coefficient c, and may be denoted as $p(x, y, v, c, \alpha)$. The Hough transform extracts ellipses from the video frame which approximate a human head's size based on coefficient c that is applied.

For a set of all candidate points $P=\{p(x, y, v, c, \alpha)\}$, a Hough transform may be generated where every found candidate p at (x,y) may be near four cells of the grid G, where the four cells may be identified by g1, g2, g3, and g4.

Since the dimensions c and $\alpha$ may be already quantized, a 4D histogram $H_4(x,y,c,\alpha)$ may be created based on the grid G and quantized values of c and α. Every candidate p(x, y, v, c, α) 408 may update the appropriate cell of $H_4(x,y,c,\alpha)$ by for example:

$$H_4(x,y,c,\alpha) \leftarrow H_4(x,y,c,\alpha)+v$$

As with other formulas used herein, different specific formulas may be used. Using linear interpolation, actually 4 cells of $H_4$ may be updated rather than one cell. Since the coordinates (x,y) of p are not quantized, update 4 neighbor cells $g_1, \ldots, g_4$ of $H_4$ (based on G cells around (x,y)), according to their proximity to (x,y):

$$H_4(g_1,c,\alpha) \leftarrow H_4(g_1,c,\alpha)+v\ w_x w_y$$

$$H_4(g_2,c,\alpha) \leftarrow H_4(g_2,c,\alpha)+v(1-w_x)w_y$$

$$H_4(g_3,c,\alpha) \leftarrow H_4(g_3,c,\alpha)+v\ w_x(1-w_y)$$

$$H_4(g_4,c,\alpha) \leftarrow H_4(g_4,c,\alpha)+v(1-w_x)(1-w_y)$$

In order to prevent choosing of casual false peaks (not from real ellipse), full ellipses may be preferred more than partial ellipses. In other words those candidates of head centers are preferred, which are based on as many various orientations as possible because full ellipses may be based on more orientations than a partial ellipse. For this purpose the four dimensional (4D) histogram $H_4(x,y,c,\alpha)$ may be projected to a three dimensional (3D) histogram $H_3(x,y,c)$ using the convex function log:

$$H_3(x,y,c) = \Sigma_\alpha \log\{1+H_4(x,y,c,\alpha)\}$$

For every head center location a coefficient c may be chosen giving the best result. In other words, a final 2D histogram $H_2(x,y)$ may be built as a maximum among the values of c:

$$H_2(x,y) = \max_c \{H_3(x,y,c)\}$$

For every (x,y) save the value of c, for which the maximum is achieved:

$$C(x,y) = \max\_ind_c\{H_3(x,y,c)\},$$

where $\max\_ind_c\{\ \}$ returns the argument c for which $H_3(x,y,c)$ achieves its maximum. In this case x, y are given constant arguments. Note that $\max_x\{f(x)\}$ may determine the maximum value of f(x) along x, whereas $\max\_ind_x\{f(x)\}$ may determine the value of x that achieves a maximum value of f(x).

Local maxima bins in the histogram $H_2(x,y)$ may be calculated, while filtering or removing maxima bins that are weaker than a threshold (the threshold may be found empirically) and filter static heads, where the optical flow has dominantly zero strength. The filtering may results in a set of detected heads with known widths: C(x,y) w(y) added to a set S.

The estimation accuracy may depend on the number of sample heads detected and on the diversity of the heads' locations. The diversity may be measured by the standard deviation $\sigma_y$ of Y coordinates of the heads in S. If standard deviation $\sigma^y|S|$ is greater than constant or threshold (the constant may be found empirically), then head detection may be complete. Otherwise the above process of heads detection may be applied to the next video frame.

The estimated horizon and scale may be further adjusted by detecting a set of human heads in a second video frame of the video stream using a different estimated horizon and scale. After an adequate number of heads are detected (e.g., in multiple frames if necessary), the horizon and scale parameters may be adjusted through the naïve testing of all possibilities by for example:

Quantizing the horizon and scale parameters by fine quantization, creating a grid G.

Calculating the 2D distribution of the matching results as function of the scene parameters over G.

The best horizon and scale giving the largest number of matching heads may be inferred from the distribution.

Figure 5:
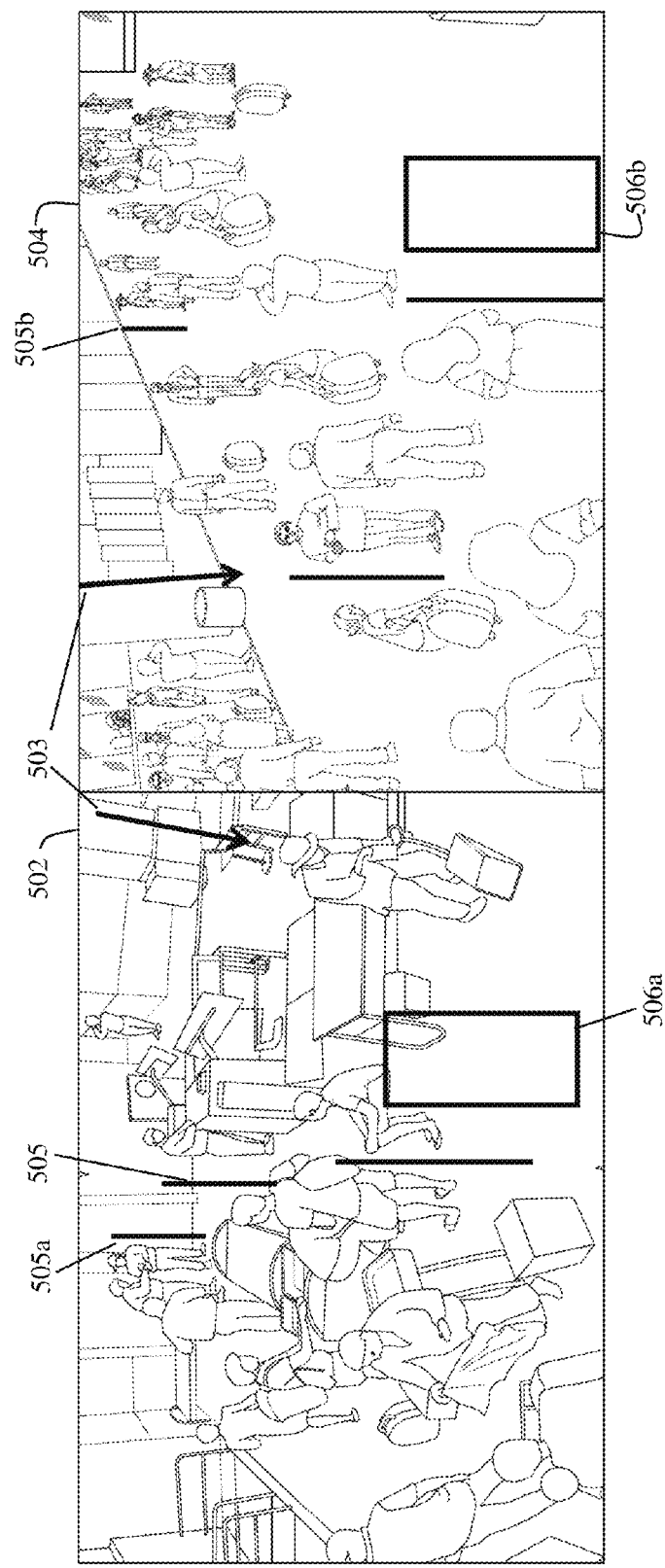
FIG. 5 is an illustration of implementing calibration of geometric scene parameters on a scene, according to embodiments of the invention.

FIG. 5 is an illustration of implementing calibration of geometric scene parameters on a scene, according to embodiments of the invention. As shown, two different scenes may yield different geometric parameters, including vertical vanishing point (indicating camera roll or tilt), horizon, and scale. In the first scene 502, the vertical vanishing point may be oriented 503 more towards the left of center than in the second scene 504. This may indicate that the camera in the first scene 502 has more tilt around a central axis than in the second scene 504. The horizon in the first scene 502 may be further away than in the second scene 504, since the average human height, depicted by the vertical lines 505 appear smaller in the second scene 504 than in the first scene 502. As shown, for example, although vertical line 505*a* in the first scene 502 is at nearly the same y-coordinate position as vertical line 505*b* in the second scene 504, vertical line 505*a* is larger than vertical line 505*b*. This may indicate that in the first scene 502, a horizon, a line with a y-coordinate where human height appears to be zero due to its distance away from the camera, is at a greater or higher y-coordinate (e.g., higher up on the video frame). In other words, the appearance of human height, as shown by vertical lines 505 may be decreasing at a lower rate in the first scene 502 than in the second scene 504 (where human height is decreasing as the y-coordinate increases). Scale, as depicted by the rectangles 506*a* and 506*b*, may be similar between the two scenes.

In one example implementation, the vertical vanishing point calculation used 30 frames on the second scene 504 and 100 frames on the first scene 502. On both scenes the result of the automatic calculation had very good precision, very close to the manual measurements: the error in the angle between an anchor point to the vanishing point was less than 2°.

The coarse estimation by optical flow worked better on the second scene 504 (error ~20%), and worse on the first scene 502 (error ~35%). The reason may be that in the first scene 502 people near the camera move slower than average due to putting on shoes and belts after security check. However this estimation error still was good enough to serve as input for the next heads detection stage (e.g., step 220 in FIG. 2).

The adjustment of horizon and scale based on detected heads worked well on both clips. However it required more frames than the vertical vanishing points calculation: 30 frames on the first clip and 160 frames on the second clip. The reason may be that there are less moving heads in this clip. The precision of horizon and scale was close to the manual measurements: the errors were less than 5% in both clips.

Figure 6:
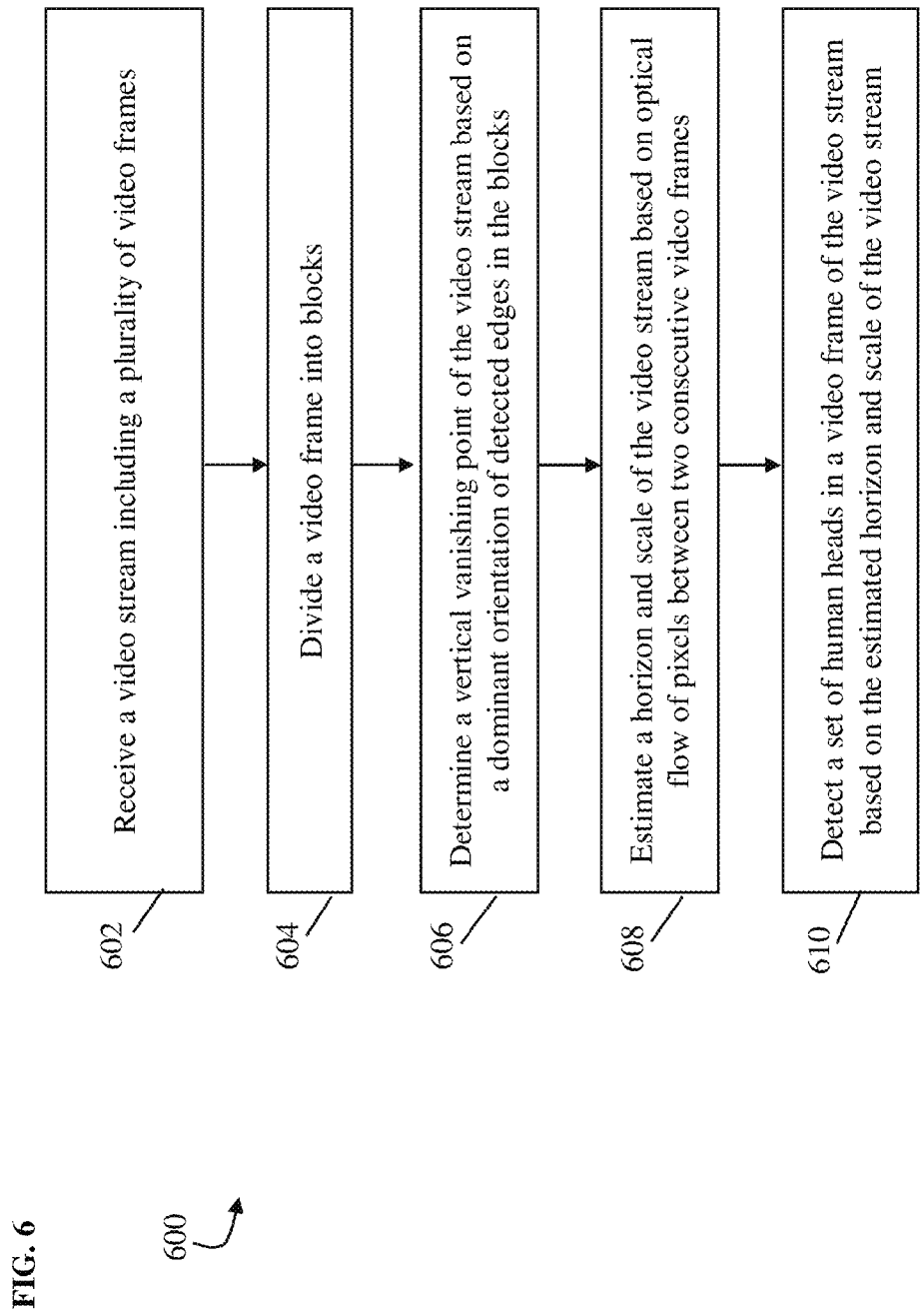
FIG. 6 is a diagram of a method for automatic calculation of scene geometry, according to embodiments of the invention.

FIG. 6 is a diagram of a method 600 for automatic calculation of scene geometry, according to embodiments of the invention. A system or method may automatically detect humans in a video stream, in real-time or near real-time (e.g., detection may occur within a few seconds or a minute at most). The method may do so via a computer system connected to a video camera. The detection of humans may occur without manual calibration of a scene's geometry. A scene's geometry, from the point of view of the video camera, may be automatically determined or estimated based on image analysis of a few frames (e.g., 1, 10, or 120 frames). In step 602, a processor may receive, via a video camera, a video stream including a plurality of video frames. The video frame may be divided into blocks at step 604. The blocks may be non-overlapping blocks of any pixel dimension, such as 8×8 or 12×12, for example. In step 606, a vertical vanishing point of the video stream may be determined, based on a dominant orientation of detected edges in the blocks. Each of the detected edges may provide a hint or indicator as to where the vanishing point may be located. An intersection point between a pair of blocks that are at least half of a frame size apart may be one such indicator point, and a group of intersection points between multiple pairs of blocks may provide a histogram of possible vanishing points. In step 608, a horizon point and scale of the video stream may be estimated based on optical flow of pixels between two consecutive video frames. In step 610, a set of human heads in a video frame may be detected based on the estimated horizon and scale of the video stream. The set of human heads may be detected using a Hough transform, for example, to extract or detect ellipses that are similar shape and size to a human head. Humans may then be detected in the video stream based on the determined vertical vanishing point and estimated horizon and scale.

Embodiments of the invention may include an article such as a non-transitory computer or processor readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

What is claimed is:

1. A method for automatic calculation of scene geometry, comprising:
   receiving, by a processor, a video stream including a plurality of video frames;
   dividing, by the processor, a video frame into blocks;
   determining a vertical vanishing point of the video stream based on a dominant orientation of detected edges in the blocks;
   estimating a horizon and scale of the video stream based on optical flow of pixels between two consecutive video frames; and
   detecting a set of human heads in a video frame of the video stream based on the estimated horizon and scale of the video stream.

2. The method of claim 1, wherein estimating the horizon and scale of the video stream comprises generating a set of estimated human head sizes at different locations within a video frame.

3. The method of claim 1, wherein detecting the set of human heads in the video frame comprises generating a set of candidate points locating a human head's center.

4. The method of claim 3, wherein detecting the set of human heads in the video frame further comprises creating a Hough transform using the generated set of candidate points.

5. The method of claim 4, wherein the Hough transform extracts ellipses from the video frame which approximate a human head's size.

6. The method of claim 1, comprising adjusting the estimated horizon and scale if a standard deviation of y-coordinates of the detected set of human heads is less than a threshold.

7. The method of claim 6, wherein adjusting the estimated horizon and scale comprises detecting a set of human heads in a second video frame of the video stream using a different estimated horizon and scale.

8. The method of claim 1, wherein estimating the horizon and scale of the video stream is further based on the detected edges in the blocks.

9. A system for automatic calculation of scene geometry, comprising:
   a memory; and
   a processor configured to:
   receive a video stream including a plurality of video frames;
   divide a video frame into blocks;
   determine a vertical vanishing point of the video stream based on a dominant orientation of edges in the blocks;
   estimate a horizon and scale of the video stream based on optical flow of pixels between two consecutive video frames; and
   detect a set of human heads in a video frame of the video stream based on the estimated horizon and scale of the video stream.

10. The system of claim 9, wherein the processor is configured to estimate the horizon and scale of the video stream by generating a set of estimated human head sizes at different locations within a video frame.

11. The system of claim 9, wherein the processor is configured to detect the set of human heads in the video frame comprises generating a set of candidate points locating a human head's center.

12. The system of claim 11, wherein the processor is configured to detect the set of human heads in the video frame by further creating a Hough transform using the generated set of candidate points.

13. The system of claim 12, wherein the Hough transform extracts ellipses from the video frame which approximate a human head's size.

14. The system of claim 9, wherein the processor is configured to adjust the estimated horizon and scale if a standard deviation of y-coordinates of the detected set of human heads is less than a threshold.

15. The system of claim 14, wherein the processor is configured to adjust the estimated horizon and scale by detecting a set of human heads in a second video frame of the video stream using a different estimated horizon and scale.

16. The system of claim 9, wherein the processor is configured to determine a vertical vanishing point of the video stream based on a set of vanishing points, wherein each vanishing point is an intersection between a pair of detected edges in a pair of blocks.

17. The system of claim 9, wherein the processor is configured to detect humans using the vertical vanishing point, horizon, and scale and refine the horizon and scale based on the detected humans.

* * * * *